US011254382B2

(12) United States Patent
Yamamoto et al.

(10) Patent No.: US 11,254,382 B2
(45) Date of Patent: Feb. 22, 2022

(54) SIDE-STAND FOR MOTORCYCLE AND MANUFACTURING METHOD THEREOF

(71) Applicant: HONDA MOTOR CO., LTD., Tokyo (JP)

(72) Inventors: Takao Yamamoto, Wako (JP); Hidekuni Kawasaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 325 days.

(21) Appl. No.: 16/363,359

(22) Filed: Mar. 25, 2019

(65) Prior Publication Data

US 2019/0300080 A1    Oct. 3, 2019

(30) Foreign Application Priority Data

Mar. 28, 2018    (JP) .............................. JP2018-062293

(51) Int. Cl.
*B62H 1/02*    (2006.01)
*B21D 53/86*    (2006.01)
*B62K 11/00*    (2006.01)

(52) U.S. Cl.
CPC ............... *B62H 1/02* (2013.01); *B21D 53/86* (2013.01); *B62H 2700/00* (2013.01); *B62K 11/00* (2013.01)

(58) Field of Classification Search
CPC ... B62H 1/02; B62H 1/00; B62H 1/06; B62H 2700/00; B62K 11/00; B21D 53/86
See application file for complete search history.

(56) References Cited

U.S. PATENT DOCUMENTS 1,530,705 A * 3/1925 Tibbott ...................... B62J 1/08
                                                                                             248/200
4,241,933 A * 12/1980 Gratza ...................... B62H 1/02
                                                                                             180/219
4,971,346 A * 11/1990 Fales, III ................. B62H 1/02
                                                                                             280/293

(Continued)

FOREIGN PATENT DOCUMENTS

CN          2172743 Y     7/1994
CN          2521115 Y    11/2002

(Continued)

OTHER PUBLICATIONS

Author Unknown, "VFR 800 Side stand 25mm short processing attachment picture!," Oct. 22, 2017, retrieved from URL:https://blogs.yahoo.co.jp/kyusbikecrafts_big/476462s3.html, 9 pages.

(Continued)

*Primary Examiner* — Tony H Winner
*Assistant Examiner* — Michael R Stabley
(74) *Attorney, Agent, or Firm* — Birch, Stewart, Kolasch & Birch, LLP

(57) ABSTRACT

A side-stand for a motorcycle enables both improvement in appearance and weight reduction by using a tapered pipe member. A side-stand for a motorcycle includes an elongate portion having a hollow structure, and a grounding portion. An outer shape of the elongate portion is tapered in appearance toward the grounding portion and, in a state in which the side-stand is unfolded, the elongate portion looks thinner as a whole in a side view than in a front view of a vehicle body. The elongate portion has a wall thickness on the distal end side equivalent to or smaller than a wall thickness on a proximal end side. The elongate portion is formed by increasing a diameter of a distal end side inner peripheral portion of a round pipe member by cutting, and then swaging an outer peripheral portion to reduce the diameter and obtain a tapered shape.

5 Claims, 11 Drawing Sheets

(56) References Cited

U.S. PATENT DOCUMENTS

| | | | | | |
|---|---|---|---|---|---|
| 4,971,347 | A | * | 11/1990 | Cline | B62H 1/02 280/301 |
| 5,346,238 | A | * | 9/1994 | Greenfield | B62H 1/00 280/293 |
| 5,351,981 | A | * | 10/1994 | Thomas | B62H 1/02 248/188.9 |
| 5,950,497 | A | * | 9/1999 | Weiher | B62K 21/12 74/551.1 |
| 6,155,370 | A | * | 12/2000 | Iwai | B62K 25/24 180/222 |
| 6,340,166 | B1 | * | 1/2002 | Rethman | B62H 1/00 248/188.9 |
| 6,601,666 | B2 | | 8/2003 | Okuma | B62K 11/04 180/227 |
| 6,695,089 | B2 | * | 2/2004 | Adachi | B62K 11/04 180/219 |
| 6,964,426 | B2 | * | 11/2005 | Kuboshima | B62H 1/02 280/301 |
| 7,631,885 | B2 | * | 12/2009 | Safarik | B62H 1/02 280/293 |
| 7,793,962 | B2 | * | 9/2010 | Imai | B62H 1/04 280/301 |
| 8,003,903 | B2 | * | 8/2011 | Nakazawa | H01H 19/58 200/61.58 R |

FOREIGN PATENT DOCUMENTS

| | | |
|---|---|---|
| CN | 1432441 A | 7/2003 |
| CN | 102009712 A | 4/2011 |
| GB | 603854 A | 6/1948 |
| GB | 1298564 A | 12/1972 |
| JP | 56-45229 A | 4/1981 |
| JP | 6-211177 A | 8/1994 |
| JP | 2001-80554 A | 3/2001 |
| JP | 2011-46226 A | 3/2011 |
| JP | 2011-51421 A | 3/2011 |
| KR | 10-2012-0047087 A | 5/2012 |

OTHER PUBLICATIONS

Honda Motor Co., Ltd., "VFR800F Part Catalogue," Third Edition, Dec. 2016, 2 pages.

Japanese Office Action for Japanese Application No. 2018-062293, dated Oct. 30, 2019, with English translation.

Taiwanese Office Action and Search Report for Taiwanese Application No. 108110316, dated Nov. 12, 2019, with partial Engtish translation.

Chinese Office Action and Search Report dated Apr. 24, 2020, for Chinese Application No. 201910231288.6, with English translation.

Japanese Office Action dated May 27, 2020, for Japanese Application No. 2018-062293, with English translation.

Kolniev, "Nonferrous Metal Forging and Die Forging Handbook", National Defense Industry Press, Dec. 1981, pp. 232, 15 pages total.

English abstract of Kolniev, "Nonferrous Metal Forging and Die Forging Handbook", National Defense Industry Press, 1st Ed., Dec. 1981, (17 pages total).

\* cited by examiner

SIDE-STAND FOR MOTORCYCLE AND MANUFACTURING METHOD THEREOF

TECHNICAL FIELD

The present invention relates to a side-stand for a motorcycle and a manufacturing method of the side-stand, and particularly to a side-stand for a motorcycle holding the vehicle body during parking in an inclined state and a manufacturing method of the side-stand.

BACKGROUND ART

In order to reduce the weight of a side-stand for a motorcycle, there is known a configuration in which an elongate portion of the side-stand is formed of a pipe member. There is also known a configuration in which an elongate portion of a side-stand is formed into a tapered shape which gradually gets smaller in diameter toward a grounding portion side (distal end side) to improve the appearance.

Patent Document 1 discloses a configuration of a side-stand having an elongate portion formed of a pipe member in which the pipe member first is flattened on a distal end side and then bent so as to have a semicircular cross section to make the elongate portion appear to be formed by using a tapered pipe member.

PRIOR ART DOCUMENT

Patent Document

Patent Document 1: Japanese Patent Laid-Open No. 2001-80554

SUMMARY OF THE INVENTION

Problem to be Solved by the Invention

In order to further improve an appearance and a texture of a side-stand, unlike the technology disclosed in Patent Document 1, it is conceivable to form an elongate portion by using a pipe member having a tapered shape in practice. Through swaging in which a pipe member is hammered while being rotated to reduce the diameter, it is possible to obtain a tapered elongate portion with relatively low cost. If swaging is performed directly on the pipe member as a base material, however, the wall thickness of the tapered portion is increased, resulting in an excessive strength and increased weight on the distal end side of the elongate portion.

It is an object of the present invention to provide a side-stand for a motorcycle enabling both improvement in appearance and weight reduction by using a tapered pipe member, and a manufacturing method of the side-stand.

Solution to Problems

To achieve the afore-mentioned object, the present invention has a first feature in a side-stand (70) for a motorcycle (1) comprising an elongate portion (71) having a hollow structure; and a grounding portion (90) attached to a distal end side of the elongate portion (71); outer shape of the elongate portion (71) being gradually tapered toward the grounding portion (90), wherein, in a state in which the side-stand (70) is unfolded, the elongate portion (71) looks thinner as a whole in a side view than in a front view of a vehicle body, and the elongate portion (71) has a wall thickness (T2) on the distal end side equivalent to or smaller than a wall thickness (T1) on a proximal end side.

The present invention has a second feature in that the elongate portion (71) is formed by increasing a diameter of a distal end side inner peripheral portion (73) of a round pipe member by cutting, and then swaging an outer peripheral portion (71a) to reduce the diameter and obtain a tapered shape.

The present invention has a third feature in that, by performing pressing after the swaging, a cross sectional shape of the elongate portion (71) becomes an ellipse having a major axis (C1, C2) oriented in a vehicle widthwise direction.

The present invention has a fourth feature in that the grounding portion (90) has a hollow structure, and the grounding portion (90) has an attachment hole (94) into which the distal end side of the elongate portion (71) is inserted formed at an upper portion thereof.

The present invention has a fifth feature in a manufacturing method of a side-stand which is applied to a side-stand (70) for a motorcycle (1), the side-stand (70) including an elongate portion (71) having a hollow structure, and a grounding portion (90) attached to a distal end side of the elongate portion (71), an outer shape of the elongate portion (71) being tapered in appearance toward the grounding portion (90), the method comprising a first step (S1) of increasing a diameter of a distal end side inner peripheral portion (73) of a round pipe member, which is to be the elongate portion (71), by cutting and a second step (S2) of swaging an outer peripheral portion (71a) of the elongate portion (71) to reduce the diameter and obtain a tapered shape.

Effects of the Invention

According to the first characteristic, in a side-stand (70) for a motorcycle (1) comprising an elongate portion (71) having a hollow structure; and a grounding portion (90) attached to a distal end side of the elongate portion (71); outer shape of the elongate portion (71) being gradually tapered toward the grounding portion (90), wherein, in a state in which the side-stand (70) is unfolded, the elongate portion (71) looks thinner as a whole in a side view than in a front view of a vehicle body, and the elongate portion (71) has a wall thickness (T2) on the distal end side equivalent to or smaller than a wall thickness (T1) on a proximal end side. Therefore, even in a case where the elongate portion is formed of a pipe member and a tapered shape is adopted for improving the appearance, the wall thickness and the strength on the distal end side of the elongate portion are not excessively increased. It is therefore possible to appropriately suppress the increase in wall thickness on the distal end side and reduce the weight of the elongate portion. Accordingly, it is possible to obtain a side-stand light in weight and superior in appearance. Further, since the elongate portion is configured so as to look thinner as a whole in a side view than in a front view of the vehicle body, the appearance in the side view, which is frequently visually recognized, can present a sharp impression.

According to the second characteristic, the elongate portion (71) is formed by increasing a diameter of a distal end side inner peripheral portion (73) of a round pipe member by cutting, and then swaging an outer peripheral portion (71a) to reduce the diameter and obtain a tapered shape. Therefore, if swaging is performed directly on the round pipe member in order to have the elongate portion tapered, the wall thickness on the distal end side usually becomes larger than that on the proximal end side. However, because the inner peripheral portion on the distal end side is cut before swaging, enabling the wall thickness on the distal end side to be finished to an appropriate thickness. Accordingly, compared with a case in which an elongate portion is manufactured by cutting or the like, it is possible to suppress the cost and obtain a side-stand light in weight and superior in appearance.

According to the third characteristic, by performing pressing after the swaging, a cross sectional shape of the elongate portion (71) becomes an ellipse having a major axis (C1, C2) oriented in a vehicle widthwise direction. Therefore, the elongate portion can be shaped elliptical in cross section by simple pressing, and it is possible to make the elongate portion look thinner in a side view than in a front view of the vehicle body. Further, since the ellipse has a major axis oriented in a vehicle widthwise direction, the side-stand can achieve enhanced load resistance.

According to the fourth characteristic, the grounding portion (90) has a hollow structure, and the grounding portion (90) has an attachment hole (94) into which the distal end side of the elongate portion (71) is inserted formed at an upper portion thereof. Therefore, the weight on the distal end side of the side-stand can be further reduced. Accordingly, a spring constant of a spring for holding the side-stand in a stored state can be made small.

According to the fifth characteristic, in a manufacturing method of a side-stand which is applied to a side-stand (70) for a motorcycle (1), the side-stand (70) including an elongate portion (71) having a hollow structure, and a grounding portion (90) attached to a distal end side of the elongate portion (71), an outer shape of the elongate portion (71) being tapered in appearance toward the grounding portion (90), the method comprising a first step (S1) of increasing a diameter of a distal end side inner peripheral portion (73) of a round pipe member, which is to be the elongate portion (71), by cutting and a second step (S2) of swaging an outer peripheral portion (71a) of the elongate portion (71) to reduce the diameter and obtain a tapered shape. Therefore, if swaging is performed directly on the pipe member in order to have the elongate portion tapered, the wall thickness on the distal end side usually becomes larger than that on the proximal end side. However, because the inner peripheral portion on the distal end side is cut before swaging, enabling the wall thickness on the distal end side to be finished to an appropriate thickness. Accordingly, it is possible to obtain a side-stand light in weight and superior in appearance.

MODES FOR CARRYING OUT THE INVENTION

Figure 1:
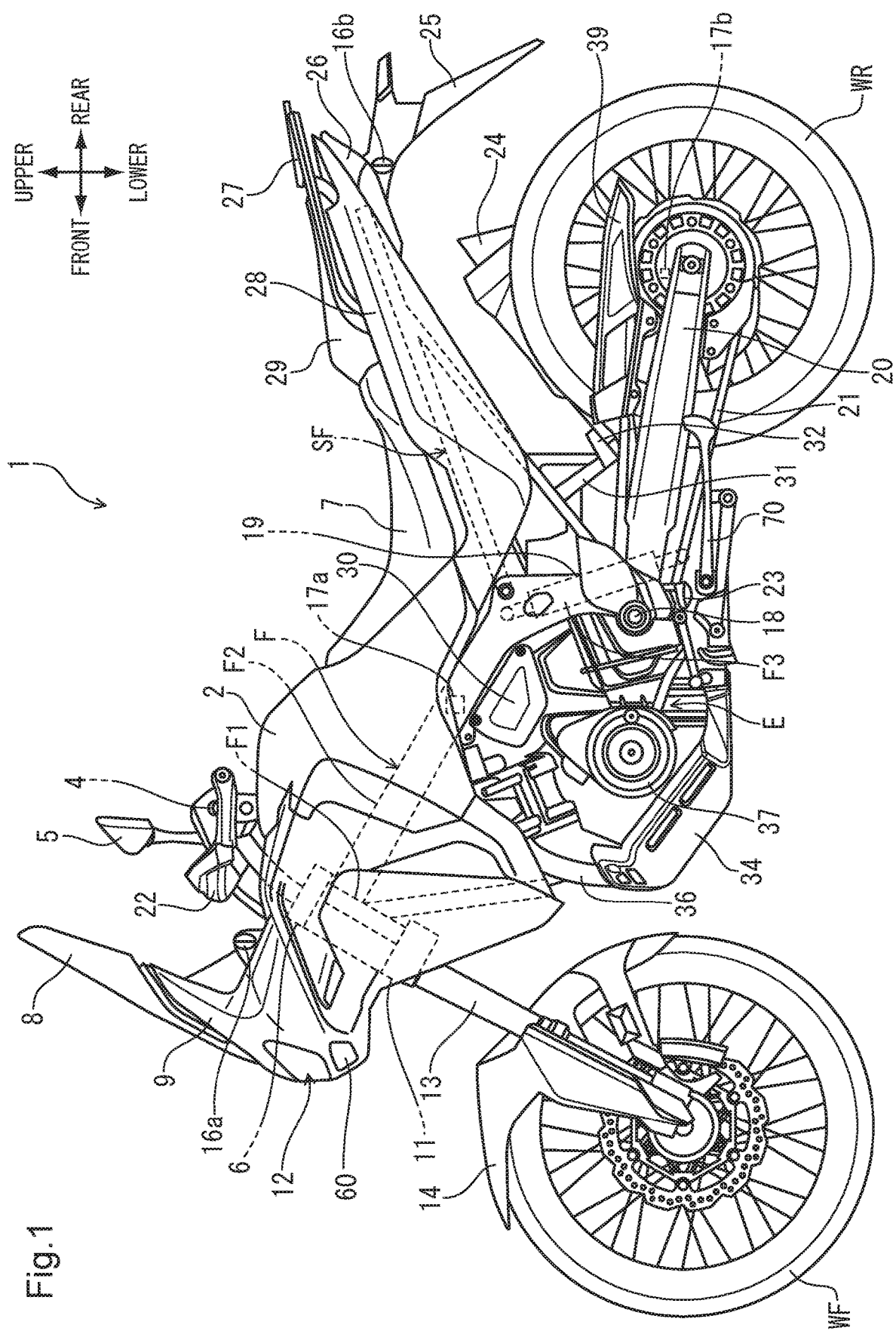
FIG. 1 is a left side view of a motorcycle to which a side-stand according to an embodiment of the present invention is applied.

FIG. 1 is a left side view of a motorcycle 1 to which a side-stand 70 according to an embodiment of the present invention is applied. The motorcycle 1 is a dual-sport saddle type vehicle which travels by transmitting a driving force of an engine E as a power source via a drive chain 21 to a rear wheel WR. A pair of left and right main frames F2 configuring a vehicle body frame F have at their front end portions in a vehicle longitudinal direction a head pipe F1 pivotally supporting a steering shaft not depicted for swing motion. A front wheel WF is rotatably supported on a pair of left and right front forks 13 which are supported by a top bridge 6 and a bottom bridge 11 fixed to the steering shaft at upper and lower portions of the head pipe F1. A steering wheel 4 is fixed to the top bridge 6, and a pair of left and right rear-view mirrors 5 and a knuckle guard 22 are mounted to the steering wheel 4.

A front side of the steering wheel 4 is covered by a front cowl 9 which supports a headlight 12 and a screen 8. Between the front cowl 9 and the steering wheel 4, a pair of left and right front turn signal devices 16a are disposed. Below the headlight 12, a cornering light 60 is disposed which is turned on in accordance with a lean angle of the motorcycle 1 in cornering and irradiates a turning direction. The front forks 13 have a front fender 14 covering the front wheel WF from above fixed thereto.

The engine E is disposed below the main frames F2. Below the engine E, an undercover 34 is disposed for protecting front and lower portions of a crankcase 37 and an exhaust pipe 36. Combustion gas in the engine E is discharged from a muffler 24 on the right side in a vehicle widthwise direction via the exhaust pipe 36.

The main frames F2 have a pair of left and right pivot frames F3 coupled to rear end lower portions thereof, and the pivot frames F3 support a pivot 18 of a swing arm 20 rotatably supporting the rear wheel WR. The pivot 18 pivotally supports a front end portion of the swing arm 20 for swing motion. The swing arm 20 is suspended from the main frames F2 by a rear cushion 19 at a position behind the pivot 18. The pivot frames F3 have a pair of left and right foot steps 23 mounted to respective lower end portions thereof. Behind the foot step 23 on the left side in the vehicle widthwise direction, the side-stand 70 is pivotally supported for swing motion. The swing arm 20 has a chain cover 39 for covering the drive chain 21 from above mounted to an upper portion thereof.

In front of the pivot frames F3 and between the main frames F2 and the engine E, an electrical component box 30 for storing an in-vehicle battery and the like is disposed. Above the electrical component box 30 and between the left and right main frames F2, a lean angle sensor 17a detecting a lean angle of the vehicle body is disposed. In the proximity of an axle of the rear wheel WR, a vehicle speed sensor 17b detecting a vehicle speed on the basis of a rotational speed of the rear wheel WR is disposed.

The main frames F2 have a fuel tank 2 disposed at an upper portion thereof and a seat frame SF extending toward the rear upper side of the vehicle body coupled to rear portions thereof. The seat frame SF has a pair of left and right pillion footstep holders 31 supporting pillion footsteps 32 mounted to lower portions thereof.

Behind the fuel tank 2, a front seat 7 and a rear seat 29 supported by the seat frame SF are disposed. The seat frame SF is covered by a rear cowl 28 from outsides in the vehicle widthwise direction. Outside the rear seat 29 in the vehicle widthwise direction, a rear carrier 27 supported by the seat frame SF is disposed. Behind the rear cowl 28, a tail light device 26 and a rear fender 25 are disposed. The rear fender 25 has a pair of left and right rear turn signal devices 16b disposed at base portions thereof.

Figure 2:
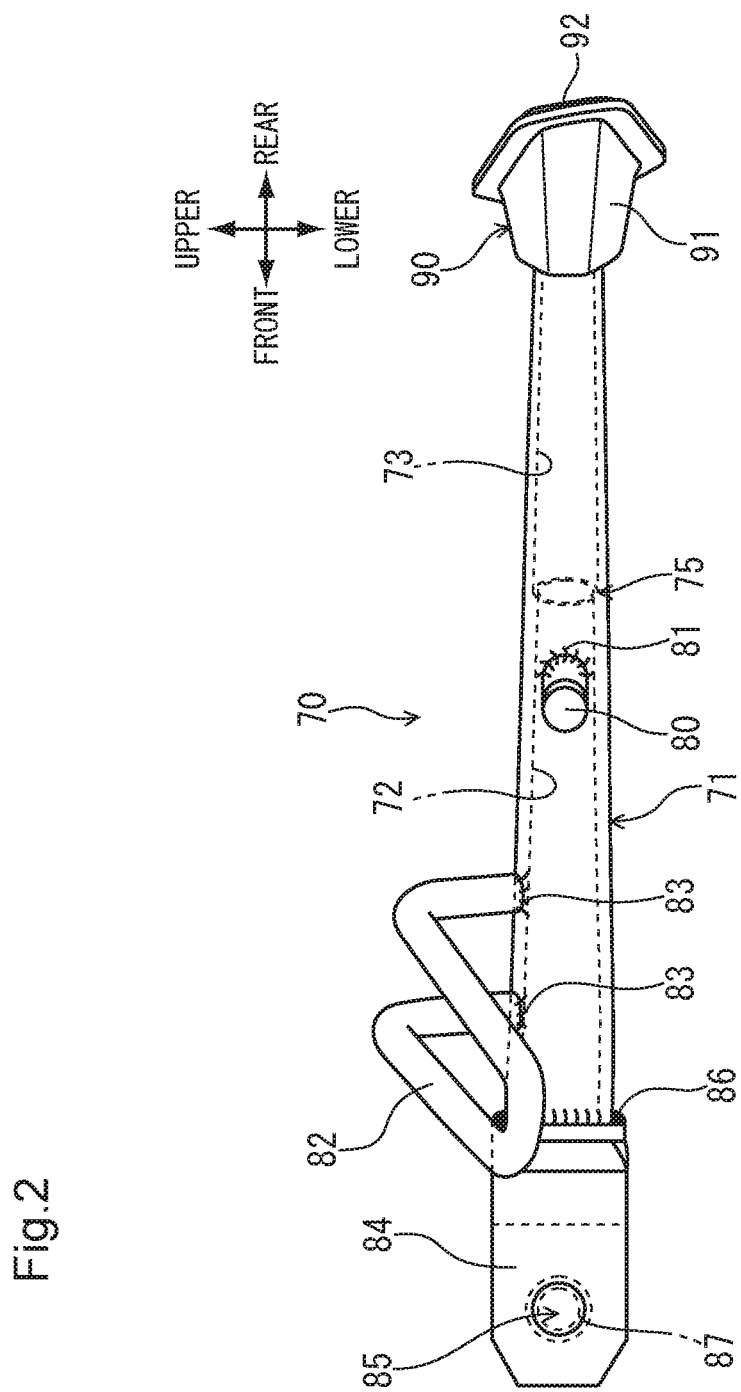
FIG. 2 is a side view of the side-stand in an unfolded state as viewed from the left side in the vehicle widthwise direction.
Figure 3:
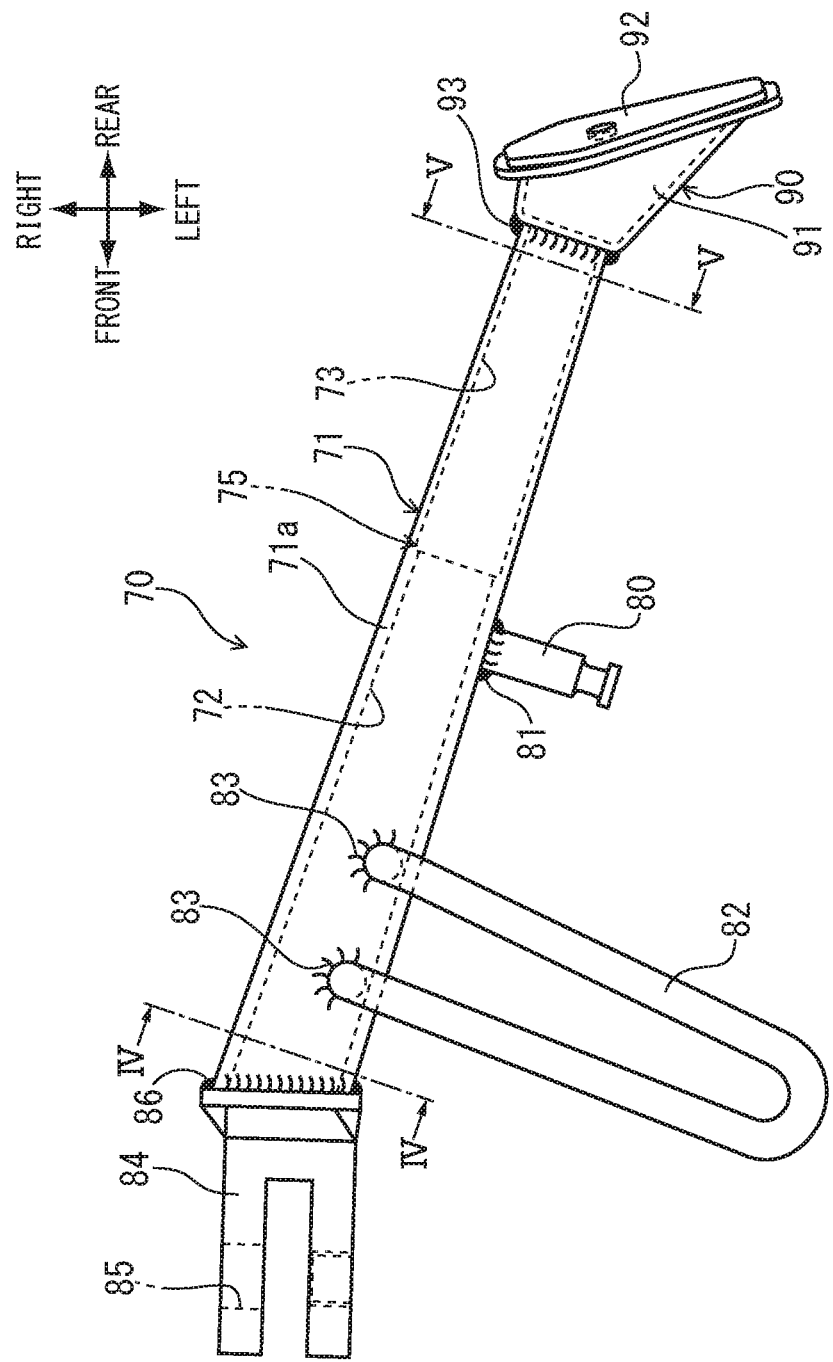
FIG. 3 is a front view of the side-stand in the unfolded state as viewed from the front side of the vehicle body.

FIG. 2 is a side view of the side-stand 70 in an unfolded state as viewed from the left side in the vehicle widthwise direction. FIG. 3 is a front view of the side-stand 70 in the unfolded state as viewed from the front side of the vehicle body. The side-stand 70 is pivotally supported on the vehicle body for swing motion between a stored state depicted in FIG. 1 and the unfolded state in which an elongate portion 71 is oriented in a substantially vertical direction. Accordingly, when viewed from the left side of the vehicle body, the side-stand 70 in the stored state looks in almost the same manner as in FIG. 2. The front view of FIG. 3 is also considered to be a plan view from above the vehicle body in the state in which the side-stand 70 is stored.

The side-stand 70 is formed of a metal such as a carbon steel for machine structure and a high tensile strength steel. The side-stand 70 is configured by connecting a base portion 84 having therein a through hole 85 through which a swing shaft 87 is pivoted to the vehicle body passes, the elongate portion 71 in a pipe shape, and a grounding portion 90 having a hollow structure to each other by welding. The base portion 84 and the elongate portion 71 are welded to each other by a weld bead 86 surrounding a connection portion therebetween. The elongate portion 71 and the grounding portion 90 are welded to each other by a weld bead 93 surrounding a connection portion therebetween.

On an outer peripheral portion 71a of the elongate portion 71, a rod-shaped hook 80 with which a spring (not depicted) for keeping the stored state or the unfolded state is engaged and a foot operated portion 82 formed of a solid member are welded by a weld bead 81 and weld beads 83, respectively.

The outer peripheral portion 71a of the elongate portion 71 is tapered such that the diameter is gradually decreased from a proximal end side at which the elongate portion 71 is connected to the base portion 84 toward a distal end side at which the elongate portion 71 is connected to the grounding portion 90. The elongate portion 71 has a proximal end side inner peripheral portion 72 and a distal end side inner peripheral portion 73 formed on an inner peripheral surface thereof with a slight step 75 formed therebetween.

The outer peripheral portion 71a has an external shape as a whole thinner in external appearance in the side view of FIG. 2 than in the plan view of FIG. 3. More specifically, the elongate portion 71 is elliptical in cross section, and an outer peripheral shape of the ellipse gradually becomes smaller from the proximal end side toward the distal end side. With this shape, it is possible to achieve both thin appearance in side view and sufficient strength.

The grounding portion 90 has a hollow structure in which a main body portion 91 shaped widened toward the distal end side of the side-stand 70 has an opening closed by a bottom plate 92 as a lid.

Figure 4:
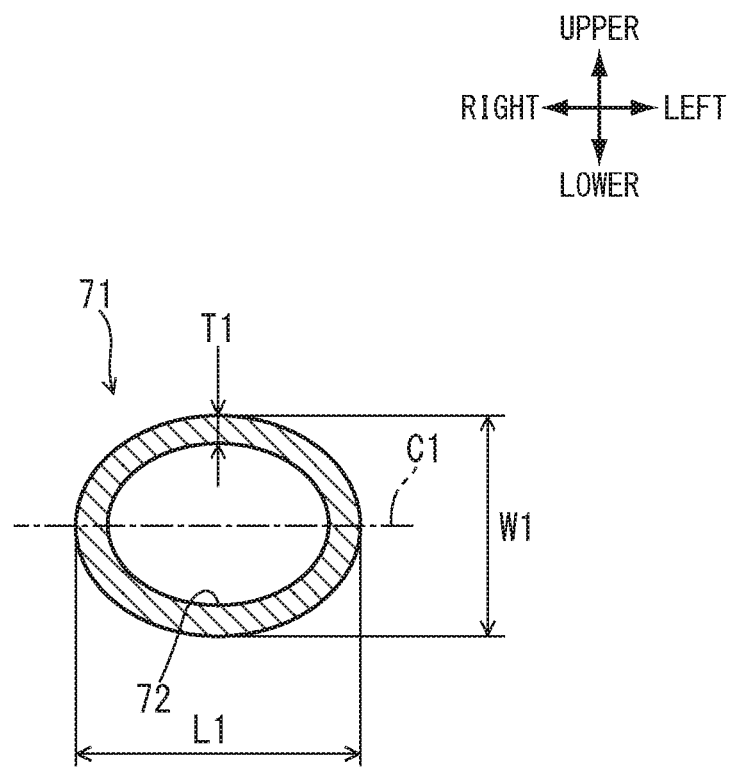
FIG. 4 is a cross-sectional view taken along line IV-IV of FIG. 3.
Figure 5:
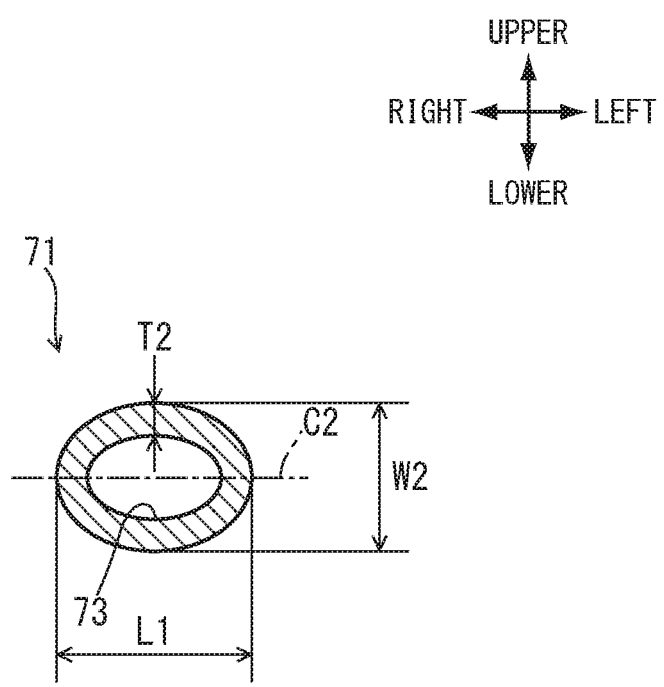
FIG. 5 is a cross-sectional view taken along line V-V of FIG. 3.

FIG. 4 is a cross-sectional view taken along line IV-IV of FIG. 2. FIG. 5 is a cross-sectional view taken along line V-V of FIG. 2. As mentioned above, the elongate portion 71 is tapered so that the diameter is gradually decreased from the proximal end side toward the distal end side, and its elliptical cross sections from a proximal end portion to a distal end portion have substantially similar shapes to each other. In other words, an outer shape of a cross section on the proximal end side is an ellipse having a major axis length L1 and a minor axis length W1, and an outer shape of a cross section on the distal end side is an ellipse having a major axis length L2 and a minor axis length W2 shorter than those on the proximal end side (L1>L2 and W1>W2). In each of the elliptical cross sections of the proximal end side and the distal end side, the minor axis length is shorter than the major axis length (L1>W1 and L2>W2). A major axis C1 of the ellipse on the proximal end side depicted in FIG. 4 and a major axis C2 of the ellipse on the distal end side depicted in FIG. 5 are each oriented in the vehicle widthwise direction. Accordingly, a part of the elongate portion 71 at which the elongate portion 71 looks thinnest appears externally in a view from the left side of the vehicle body and, when the vehicle weight is applied on the side-stand 70 in the unfolded state, the side-stand 70 can receive a bending stress on the major axis side of the elliptical cross section having high strength.

The elongate portion 71 has a wall thickness T2 on the distal end side equivalent to or smaller than a wall thickness T1 on the proximal end side. In other words, the wall thickness of the elongate portion 71 is configured so as not to greatly change from the proximal end side to the distal end side.

It is difficult to manufacture the elongate portion 71 having such a shape by casting, and manufacturing by cutting significantly increases the material cost and man-hours for production. Accordingly, the side-stand 70 according to the present embodiment is formed by increasing the diameter of an inner peripheral portion on a distal end side of a round pipe member by cutting and then swaging the entire round pipe member, so that the side-stand 70 can be tapered in appearance and weight reduction on the distal end side can be achieved.

Swaging, or cold rotary forging, is a processing in which a workpiece set at a rotational center is hammered at an outer peripheral surface thereof by a plurality of dies while being rotated, and this processing can be readily performed by a numerically controlled (NC) swaging apparatus or the like.

Figure 6:
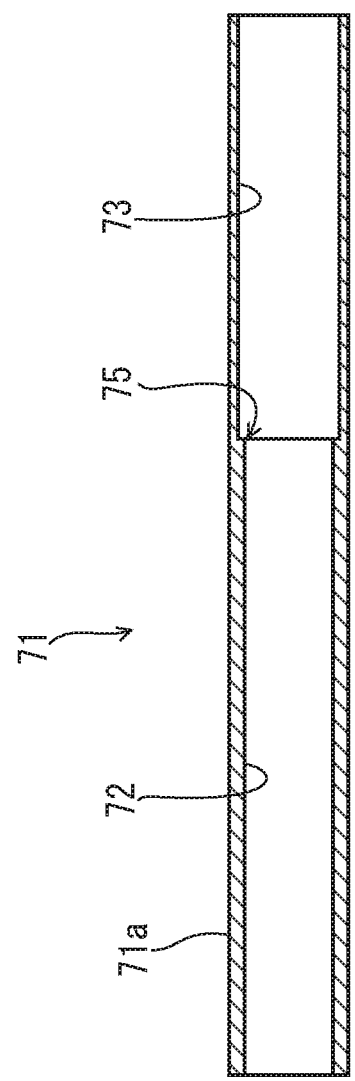
FIG. 6 is a cross-sectional view of the elongate portion before swaging.

FIG. 6 is a cross-sectional view of the elongate portion 71 before swaging. As mentioned above, in preparing the elongate portion 71, swaging is performed to form the outer peripheral portion 71a into the tapered shape after increasing the diameter of the inner peripheral portion on the distal end side of the round pipe member as a base material by cutting. The cutting can be readily performed by boring the inner peripheral portion on the distal end side of the round pipe member having uniform wall thickness with an NC lathe or the like. The step 75 is formed between the proximal end side inner peripheral portion 72 and the distal end side inner peripheral portion 73 in this manner. A depth and an increased amount of the diameter in the boring can be suitably set depending on a finished dimension after swaging or the like.

The swaging processing according to the present embodiment is intended to have the elongate portion 71 as a whole tapered toward the distal end side with roughly no change in diameter on the proximal end side of the elongate portion 71. Therefore, a diameter reduction rate and a rate of increase in wall thickness both increase toward the distal end side. However, since the processing for increasing the diameter is performed in advance as described above, the wall thickness on the distal end side after swaging can be kept equivalent to or smaller than the wall thickness on the proximal end side.

If swaging is performed on the round pipe member as the base material without increasing the diameter on a distal end side, the wall thickness gradually increases toward the distal end side, even if the outer shape of the round pipe member achieves desired dimensions. As a result, the distal end side ends up having an excessive strength and increased weight, which leads to a heavy operation feeling for an occupant in switching the side-stand between the stored state and the unfolded state by his/her foot, or to a necessity to provide a stronger spring for holding the side-stand in the stored state.

Figure 7:
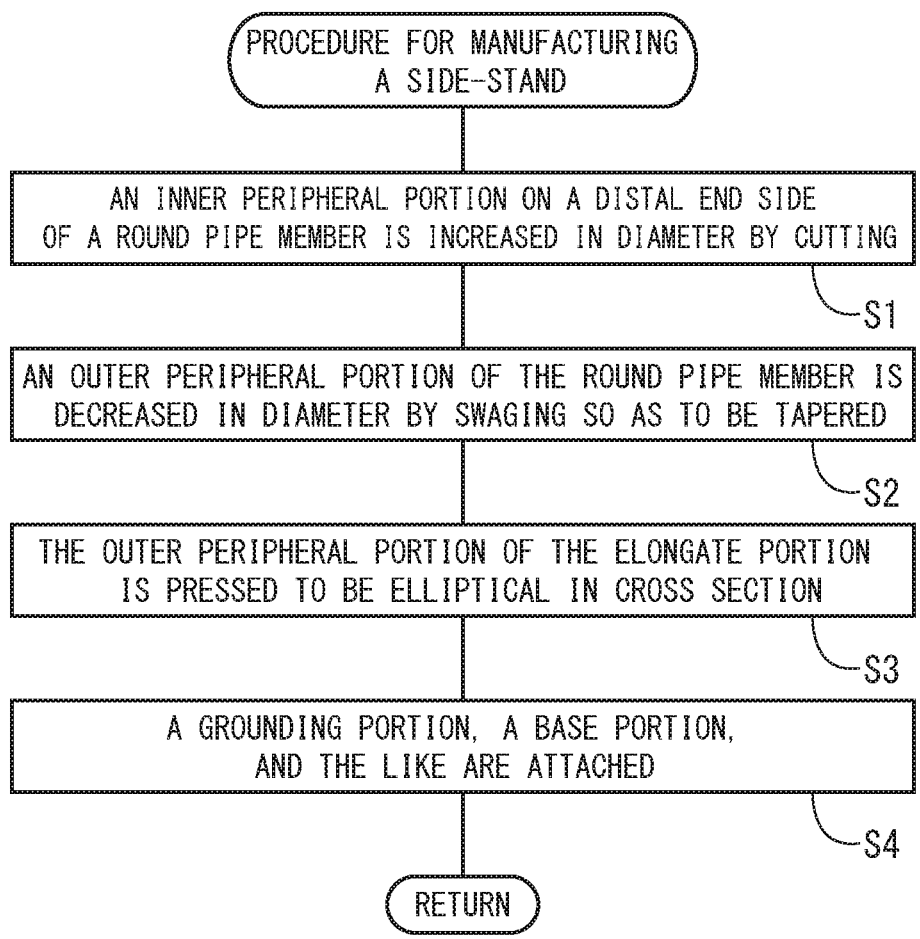
FIG. 7 is a flow chart representing a procedure for manufacturing the side-stand.

FIG. 7 is a flow chart representing a procedure for manufacturing the side-stand 70. In step S1 as a first step, an inner peripheral portion on a distal end side of a round pipe member is increased in diameter by cutting. Next, in step S2 as a second step, an outer peripheral portion of the round pipe member is decreased in diameter by swaging so as to be tapered. By these steps S1 and S2, an elongate portion 71 having the outer peripheral portion in tapered shape and a circular cross section is formed.

In step S3 as a third step, the outer peripheral portion of the elongate portion 71 is pressed to be elliptical in cross section. Pressing can be readily performed by a press machine pressing a die against an object from above with a predetermined pressure. With the elongate portion 71 having been subjected to pressing in the third step, it is possible to make a part of the elongate portion 71 at which the elongate portion 71 looks thinnest appear externally and, while the side-stand 70 is being used, the side-stand 70 can receive a bending stress with the major axis side of the elliptical cross section having high strength.

In step S4 as a fourth step, the grounding portion 90, the base portion 84, the hook 80, and the like are attached to the elongate portion 71, configuring the side-stand 70. Besides the fourth step, steps for removing burrs at welded portions, polishing, coating and the like may be performed.

Figure 8:
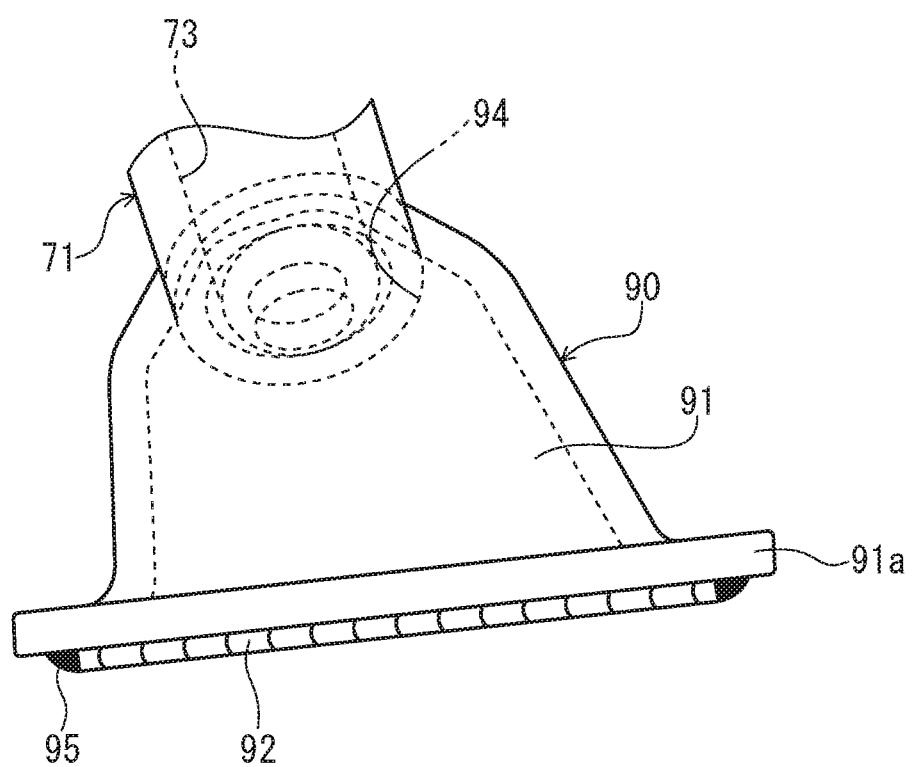
FIG. 8 is an enlarged side view of the grounding portion.
Figure 9:
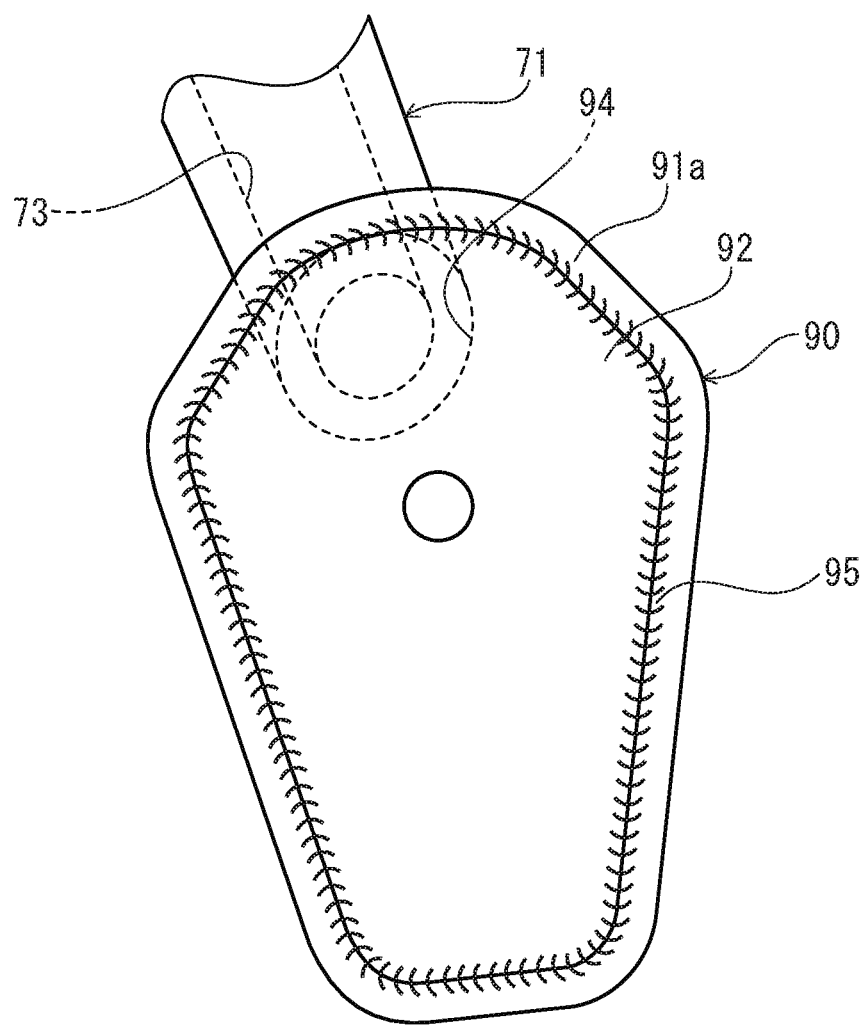
FIG. 9 is an enlarged bottom view of the grounding portion.

FIG. 8 is an enlarged side view of the grounding portion 90. FIG. 9 is an enlarged bottom view of the grounding portion 90. The grounding portion 90 is formed by welding the bottom plate 92 in a flat plate shape to a bottom portion of the main body portion 91 in an umbrella shape. The main body portion 91 is formed by pressing a thin plate member having an attachment hole 94, into which the distal end side of the elongate portion 71 is inserted, formed at a substantially center thereof. The bottom plate 92 is welded to a flange portion 91a in a flat plate shape provided at a lower end edge of the main body portion 91 by a weld bead 95 surrounding a side edge of the bottom plate 92. The grounding portion 90 is formed to have a hollow structure in this manner, enabling further reduction in weight on the distal end side of the side-stand 70.

Figure 10:
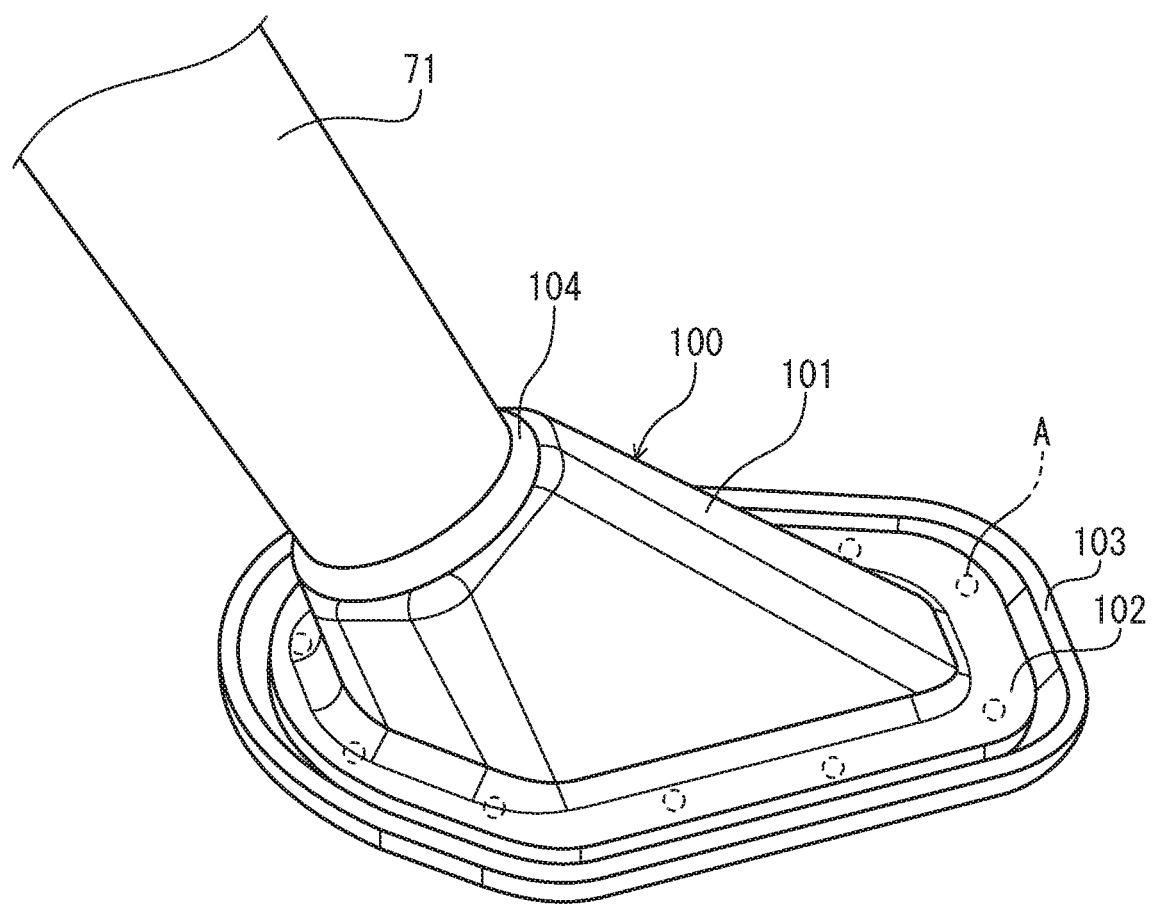
FIG. 10 is a perspective view of a grounding portion according to a modification to the present embodiment.
Figure 11:
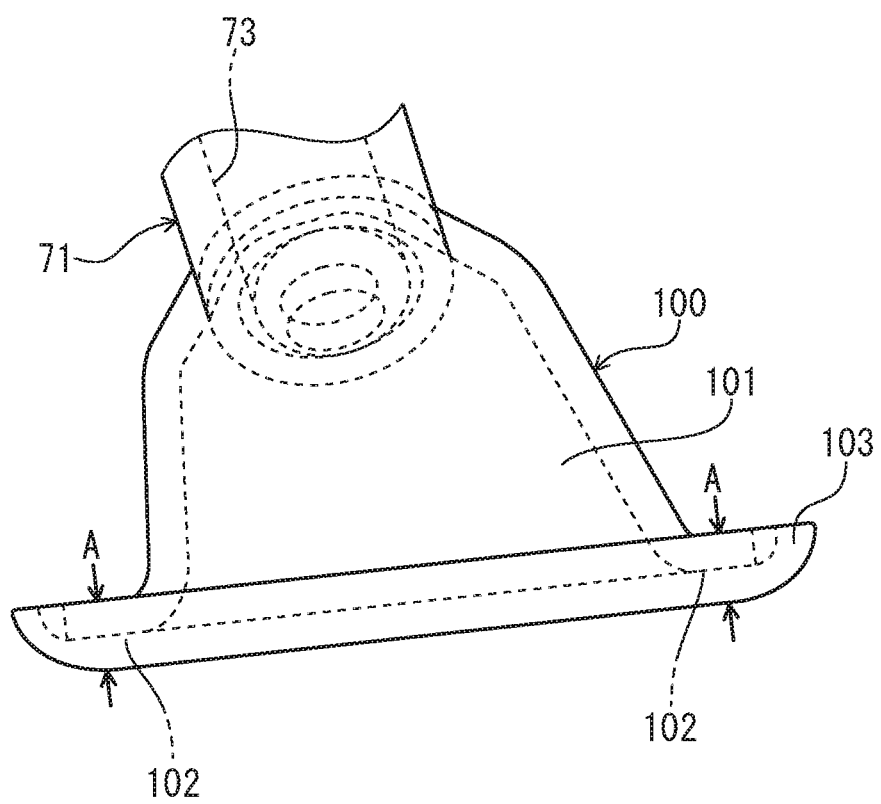
FIG. 11 is a side view of the grounding portion according to a modification to the present embodiment.

FIG. 10 is a perspective view of a grounding portion 100 according to a modification to the present embodiment. FIG. 11 is a side view of the grounding portion 100. The grounding portion 100 is configured by welding a bottom plate 103 having a peripheral edge portion curved upward to a bottom portion of a main body portion 101 in an umbrella shape. The distal end portion of the elongate portion 71 and the grounding portion 100 are welded to each other by a weld bead 104 surrounding an outer periphery of the elongate portion 71.

The main body portion 101 is formed by pressing a thin plate member having an attachment hole, through which the distal end side of the elongate portion 71 is inserted, formed at a substantially center thereof. The bottom plate 103 is welded to a flange portion 102 in a flat plate shape provided at a lower end edge of the main body portion 101 by spot welding at a plurality of welded portions A. Accordingly, the bottom plate 103 can be welded by simple welding, and a side-stand having a curved shape at a lower end edge of a grounding portion and thus presenting high texture can be obtained.

The side-stand for a motorcycle according to the present embodiment is configured such that the elongate portion 71 of the side-stand 70 in the unfolded state looks thinner as a whole in a side view than in a front view of the vehicle body. Further, the elongate portion 71 has the wall thickness T2 on the distal end side equivalent to or smaller than the wall thickness T1 on the proximal end side. Accordingly, even in a case where the elongate portion 71 is formed of a pipe member and a tapered shape is adopted for improving the appearance, the wall thickness and the strength on the distal end side of the elongate portion 71 are not excessively increased. It is therefore possible to appropriately suppress the increase in wall thickness on the distal end side and reduce the weight of the elongate portion 71.

The elongate portion 71 is formed by increasing the diameter of the distal end side inner peripheral portion 73 of the round pipe member by cutting, and then swaging the outer peripheral portion 71a to reduce the diameter and obtain the tapered shape. If swaging is performed directly on the round pipe member in order to have the elongate portion 71 tapered, the wall thickness on the distal end side becomes larger than that on the proximal end side. In the present embodiment, the inner peripheral portion on the distal end side is cut before swaging, enabling the wall thickness on the distal end side to be finished to an appropriate thickness. Accordingly, compared with a case in which an elongate portion is formed by cutting or the like, it is possible to suppress the cost and obtain the side-stand 70 light in weight and superior in appearance.

The mode of the motorcycle, the shape and the material of the side-stand, the tapered shape and the elliptical cross section of the elongate portion, the dimension and the amount of increase in diameter by cutting of the round pipe member as the base material of the elongate portion, the shape and the structure of the grounding portion, the shapes of the weld beads, and the like are not limited to those in the embodiment, and various modifications are possible. For example, the elongate portion may be assembled as a side-stand in the state of having a circular cross section after subjected to cutting and swaging. The elliptical shape in cross section obtained as a result of pressing may include an oval shape having a straight line portion.

EXPLANATION OF SIGN

1 . . . motorcycle, 70 . . . side-stand, 71 . . . elongate portion, 71a . . . outer peripheral portion, 72 . . . proximal end side inner peripheral portion, 73 . . . distal end side inner peripheral portion, 90 . . . grounding portion, 94 . . . attachment hole, C1 . . . major axis of the ellipse on the proximal end side, C2 . . . major axis of the ellipse on the distal end side, T1 . . . wall thickness on the proximal end side, T2 . . . wall thickness on the distal end side, S1 . . . first step, S2 . . . second step

The invention claimed is:
1. A side-stand for a motorcycle comprising:
an elongate portion having a hollow structure; and
a grounding portion attached to a distal end side of the elongate portion;

wherein an outer shape of the elongate portion is gradually tapered toward the grounding portion, wherein, in a state in which the side-stand is unfolded, the elongate portion looks thinner as a whole in a side view than in a front view of a vehicle body, wherein the elongate portion has a wall thickness on the distal end side equivalent to or smaller than a wall thickness on a proximal end side, and wherein the elongate portion is formed by increasing a diameter of an entire circumference of a distal end side inner peripheral portion of a round pipe member by cutting, and then swaging an outer peripheral portion to reduce the diameter and obtain a tapered shape.

2. The side-stand for a motorcycle according to claim 1, wherein, by performing pressing after the swaging, a cross sectional shape of the elongate portion becomes an ellipse having a major axis oriented in a vehicle widthwise direction.

3. The side-stand for a motorcycle according to claim 2, wherein the grounding portion has a hollow structure, and wherein the grounding portion has an attachment hole into which the distal end side of the elongate portion is inserted formed at an upper portion thereof.

4. The side-stand for a motorcycle according to claim 1, wherein the grounding portion has a hollow structure, and wherein the grounding portion has an attachment hole into which the distal end side of the elongate portion is inserted formed at an upper portion thereof.

5. A manufacturing method of a side-stand which is applied to a side-stand for a motorcycle, the side-stand including an elongate portion having a hollow structure, and a grounding portion attached to a distal end side of the elongate portion, an outer shape of the elongate portion being tapered in appearance toward the grounding portion, the method comprising the steps of:

increasing a diameter of an entire circumference of a distal end side inner peripheral portion of a round pipe member, which is to be the elongate portion, by cutting; and swaging an outer peripheral portion of the elongate portion to reduce the diameter and obtain a tapered shape.

* * * * *